US012774851B2

(12) United States Patent
Tegelkamp et al.

(10) Patent No.: US 12,774,851 B2
(45) Date of Patent: Oct. 27, 2026

(54) DRYING PROCESS, DRYING DEVICE AND VACUUM CONVEYOR WITH DRYING

(71) Applicant: Volkmann GmbH, Soest (DE)

(72) Inventors: Christopher Tegelkamp, Büren (DE); Roman Jäger, Soest (DE)

(73) Assignee: Volkmann GmbH, Soest (DE)

( * ) Notice: Subject to any disclaimer, the term of this patent is extended or adjusted under 35 U.S.C. 154(b) by 901 days.

(21) Appl. No.: 17/987,602

(22) Filed: Nov. 15, 2022

(65) Prior Publication Data

US 2023/0266062 A1 Aug. 24, 2023

(51) Int. Cl.
*F26B 5/04* (2006.01)
*B33Y 40/10* (2020.01)

(52) U.S. Cl.
CPC .............. *F26B 5/041* (2013.01); *B33Y 40/10* (2020.01); *F26B 2200/08* (2013.01)

(58) Field of Classification Search
CPC ....... F26B 5/041; F26B 2200/08; B33Y 40/10
USPC ........................................................... 34/359
See application file for complete search history.

(56) References Cited

U.S. PATENT DOCUMENTS

| | | | | |
|---|---|---|---|---|
| 5,485,754 | A * | 1/1996 | Harpster | G01N 25/60 73/861.04 |
| 9,278,391 | B1 * | 3/2016 | Baer | B22F 9/30 |
| 2002/0024162 | A1 * | 2/2002 | Maguire | B29B 9/16 264/102 |
| 2005/0102851 | A1 * | 5/2005 | He | F26B 21/10 34/92 |
| 2019/0046924 | A1 * | 2/2019 | Rheaume | A62C 3/002 |
| 2019/0291184 | A1 * | 9/2019 | Buller | B29C 64/20 |

* cited by examiner

*Primary Examiner* — Connor J Tremarche
(74) *Attorney, Agent, or Firm* — UB Greensfelder LLP; Brian E. Turung

(57) ABSTRACT

A method and to a device for drying a powdered and/or granular material for additive manufacturing, in particular for drying a metal powder or a metal powder blend. The material to be dried is contained in an evacuable volume, in particular in a vacuum conveyor. The evacuable volume is fluidically connected to a vacuum pump arrangement. The vacuum pump arrangement is fluidically connected on the inlet side to the evacuable volume and on the outlet side to the surroundings of the evacuable volume. The vacuum pump arrangement on the outlet side comprises a sensor for recording the moisture in the fluid pumped out of the evacuable volume, with the sensor being used to record the residual moisture in the powdered and/or granular material as a function of the moisture in the fluid that is pumped out.

15 Claims, 1 Drawing Sheet

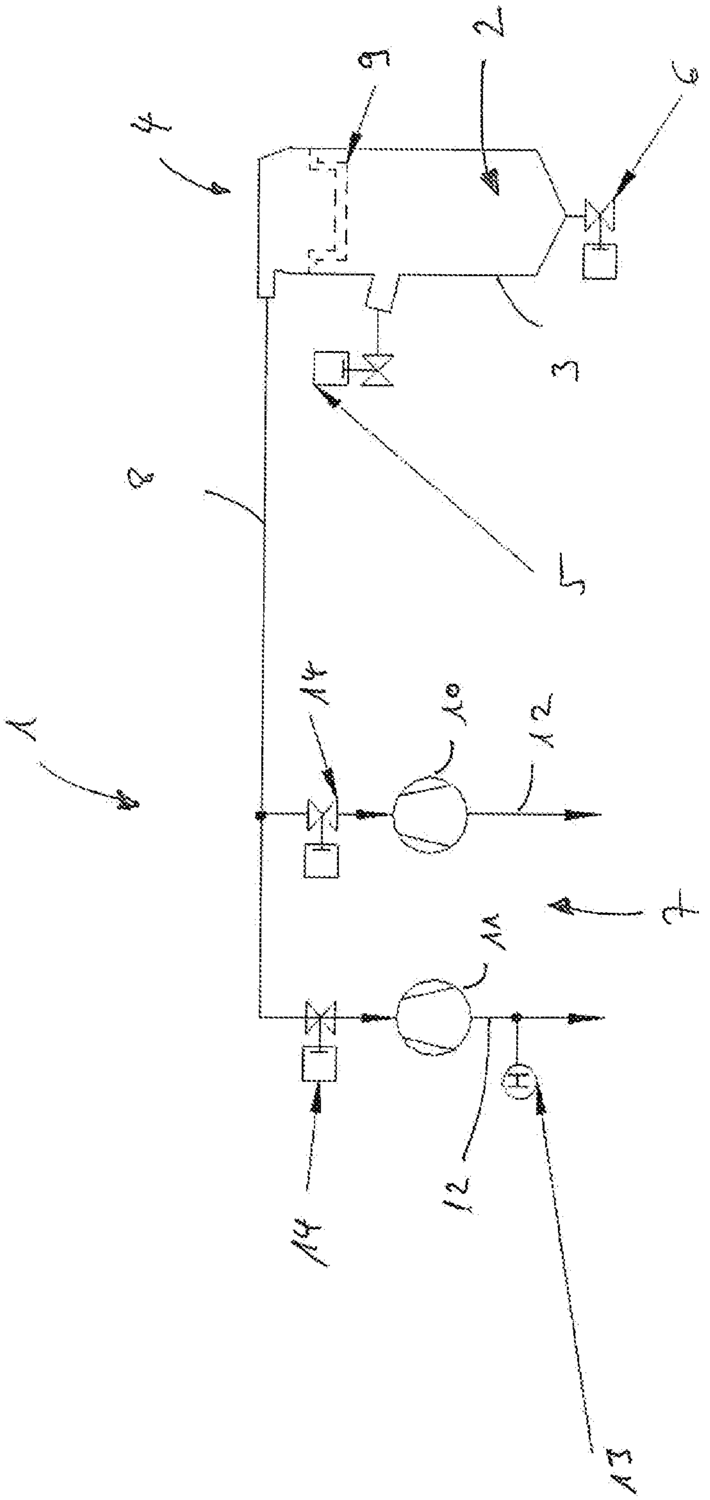
1
2
3
4
5
6
7
8
9
10
11
12
12
13
14
14

DRYING PROCESS, DRYING DEVICE AND VACUUM CONVEYOR WITH DRYING

FIELD OF THE INVENTION

The invention relates to a method for drying a powdered and/or granular material for additive manufacturing, and in particular for drying a metal powder or a metal powder blend. The method serves for drying a powdered and/or granular material for additive manufacturing, in particular for drying a metal powder or a metal powder blend. The material to be dried is contained in an evacuable volume or in a container, in particular in a vacuum conveyor or a container of a vacuum conveyor. The evacuable volume is fluidically connected to a vacuum pump arrangement. The vacuum pump arrangement is fluidically connected on the inlet side to the evacuable volume and on the outlet side to the surroundings of the evacuable volume. In the present document, drying is understood to mean driving a liquid out of the material, it being possible for the liquid to contain water or be formed from water, and/or it being possible for the liquid to contain a solvent or be formed from a solvent. Solvents are used for example in binder jetting. In this respect, the powdered and/or granular material is adhesively bonded to a binder agent beforehand, which binder agent must be driven out of the material again before the material is further processed. This driving out of the binder agent is done by means of the drying measures described in the present document.

The invention moreover relates to a device for drying a powdered and/or granular material for additive manufacturing, and in particular for drying a metal powder or a metal powder blend. Accordingly, the device serves for drying a powdered and/or granular material for additive manufacturing, in particular for drying a metal powder or a metal powder blend. The device comprises an evacuable volume, which can be filled with the material to be dried. The evacuable volume may be in the form of a container or be arranged in a container. When the evacuation takes place, the air or a gaseous fluid is pumped out of the volume interior or the container interior into the surroundings or to some other fluid handling means. Provided for this purpose is a vacuum pump arrangement, which is fluidically connected to the evacuable volume. The vacuum pump arrangement is fluidically connected on the inlet side to the evacuable volume and on the outlet side to the surroundings of the evacuable volume.

Lastly, the invention relates to a vacuum conveyor for conveying a powdered and/or granular material for additive manufacturing, and in particular for conveying a metal powder or a metal powder blend. The vacuum conveyor serves to convey a powdered and/or granular material for additive manufacturing, in particular for conveying a metal powder or a metal powder blend.

In additive manufacturing, use is often made of powdered and/or granular materials such as metal powder or metal powder blends. In order to be able to achieve high quality and reproducible quality when processing these materials in the additive manufacturing devices, it is necessary to use quantities of material which are as dry as possible, i.e. the material should contain as little moisture as possible. A heating means can be used to dry, or drive the moisture out of, the material. To determine the residual moisture in the material, and in this respect to determine the duration of an efficient heating operation, up to now the residual moisture was determined by sensor, by introducing a sensor into the powdered/granular material. This is where the invention comes in.

SUMMARY OF THE INVENTION

Against this background, the object is to improve the drying of powdered and/or granular material with as little outlay on equipment and costs as possible. This object is achieved by a method for drying a powdered and/or granular material for additive manufacturing, and in particular for drying a metal powder or a metal powder blend. Preferred embodiments will emerge from the dependent claims and from the additional independent claims. In the case of the method, it is accordingly provided that the pump arrangement comprises a positive-displacement pump for vacuum drying and a jet pump for vacuum conveying, in particular a single-stage or multiple-stage ejector pump for vacuum conveying, or a compressor, in particular a side-channel compressor, for vacuum conveying. The device can be used to convey and dry a powdered and/or granular material without it being necessary to move the material into another device for drying purposes. In this respect, the material is dried without the vacuum environment created for vacuum conveying purposes being aerated or opened. In this way, not only is the outlay on equipment reduced, but also the entry of impurities and the like into the material is avoided.

An improvement to the drying of powdered and/or granular materials with as little outlay on equipment and costs as possible is further made by means of a method wherein the vacuum pump arrangement on the outlet side comprises a sensor for recording the moisture in the fluid pumped out of the evacuable volume, the sensor being used to record the residual moisture in the powdered and/or granular material as a function of the moisture in the fluid that is pumped out. Accordingly, there is no provision for measuring the moisture in the evacuable volume or in the material arranged in the volume. Consequently, determination of the moisture in the material directly, which is complex and expensive on account, inter alia, of the necessary explosion protection, is dispensed with, as a result of which the drying or moisture-determining method according to the invention considerably simplifies the handling of material and considerably reduces associated costs. According to the invention, a fluid, for example air, is removed from the volume and the determination of the moisture in the air that is pumped out serves to determine or calculate the residual moisture in the material. It is expedient when, to that end, a calibration of the sensor by means of a test medium is carried out. The test medium may be a medium which has a known moisture, with the result that the sensor data evaluation can be compared with the data of the test medium when applying the method according to the invention.

The pump arrangement may preferably comprise a positive-displacement pump, for instance a vane oil pump, and/or a jet pump, in particular a single-stage or multiple-stage ejector pump. A Multijector® may be used as multiple-stage ejector pump, for example. The jet pump conveys the material within the arrangement of equipment, in particular into the evacuable volume, and the positive-displacement pump evacuates the evacuable volume for vacuum drying purposes. For vacuum conveying purposes, a compressor, in particular a side-channel compressor, may selectively (alternatively or additionally) be provided. The pumps are preferably not operated at the same time, in particular in normal operation. First of all the jet pump (compressor) is used to convey material, and then evacuation is performed by the positive-displacement pump for material drying purposes.

Since the positive-displacement pump of the pump arrangement is provided for the vacuum drying, it is expedient when the sensor is arranged on the outlet side of the positive-displacement pump, in particular on or in an outlet-side flow channel of the positive-displacement pump. In this respect, the sensor is located in the exit air flow or in a fluid flow that is leaving the arrangement of equipment. There, the sensor can be attached easily and, for instance when maintenance is necessary, can be easily exchanged or adjusted. An expensive sensor inside the evacuable volume is not necessary, and therefore contamination of the sensor by the material in the evacuable volume is not relevant. Contamination of the sensor provided in the outlet region of the pump arrangement according to the invention is virtually completely ruled out. Specific approval for the sensor arranged outside of the evacuable volume, for instance in connection with the explosion protection guidelines like 94/9/EG ("Atex" approval) is not necessary, this considerably reducing the outlay on costs for the equipment components.

A suction fluid flow, in particular suction air flow, can be created in the evacuable volume by means of the pump arrangement, with the result that the powdered and/or granular material can be conveyed into the evacuable volume through a volume inlet by means of suction fluid flow, in particular suction air flow, and conveyed out of the evacuable volume through a volume outlet, preferably by means of suction fluid flow, in particular suction air flow. The fluid flow accelerates the drying and the residual moisture decreases more quickly until the desired degree of residual moisture is reached. Instead of air, or in addition to air, an (inert) gas may be provided as suction fluid flow. If appropriate, preparation of the exit air is expedient.

To charge the arrangement of equipment, at least one blocking device may be provided between the pump arrangement and the evacuable volume. By actuating the blocking device, the pump arrangement or components of the pump arrangement can be fluidically separated from the evacuable volume, with the result that, for example, the volume can be opened, for instance in order to fill it with material or remove material therefrom.

To optimize the accuracy of the sensor data, at least one reference moisture may be recorded, preferably in the surroundings of the evacuable volume. It is thus possible, for example, to record the degree of moisture in the material precisely even when the method is carried out in surroundings with a comparatively high degree of moisture in the room or in the air. In surroundings with a high degree of moisture in the air, the material can be dried for a longer period of time; in surroundings with comparatively dry air, the drying can be accelerated.

To determine the residual moisture in the powdered and/or granular material, in addition to the sensor signal it is also possible to take into account the change in the sensor signal over time. The sensor may be designed such that the moisture in the sensor surroundings or in the sensor interior can be determined capacitively.

In particular in terms of the drying or driving-out of solvents such as binder agents, it can be expedient when the evacuable volume is heated. In this respect, thermal assistance in the range of approximately 90° C. to approximately 250° C., in particular approximately 100° C., may be provided.

An improvement to the drying of powdered and/or granular materials with as little outlay on equipment and costs as possible is further made by a device for drying a powdered and/or granular material for additive manufacturing, and in particular for drying a metal powder or a metal powder blend. The device serves for drying a powdered and/or granular material for additive manufacturing, in particular for drying a metal powder or a metal powder blend. The pump arrangement of the device comprises a positive-displacement pump for vacuum drying and a jet pump for vacuum conveying, in particular a single-stage or multiple-stage ejector pump for vacuum conveying, or a compressor, in particular a side-channel compressor, for vacuum conveying.

An improvement to the drying of powdered and/or granular materials with as little outlay on equipment and costs as possible is further made by a device wherein the outlet side comprises a sensor for recording the moisture in the fluid pumped out of the evacuable volume of the device. The sensor can be used to record the residual moisture in the powdered and/or granular material as a function of the moisture in the fluid ((exit) air, (inert) gas) that is pumped out. The pump arrangement may comprise a positive-displacement pump and/or a jet pump, in particular a single-stage or multiple-stage ejector pump, for example a Multijector®. It is also possible to provide a compressor, in particular a side-channel compressor for vacuum conveying. The sensor may be arranged on the outlet side of the positive-displacement pump, in particular on or in an outlet-side flow channel of the positive-displacement pump. A suction fluid flow, in particular suction air flow, can be created in the evacuable volume by means of the pump arrangement, in particular by means of the jet pump of the arrangement, with the result that the powdered and/or granular material can be conveyed into the evacuable volume through a volume inlet by means of suction fluid flow, in particular suction air flow, and conveyed out of the evacuable volume through a volume outlet, preferably by means of suction fluid flow, in particular suction air flow. The volume may also be emptied by gravity through an outlet opening in the bottom region of the volume/container. At least one blocking device arranged between the pump arrangement and the evacuable volume may be provided. A blocking device is preferably fluidically connected upstream of each pump of the pump arrangement, with the result that the pump action of each of the pumps or of the two pumps of the arrangement can be blocked separately by means of first and second and optionally further blocking devices. The blocking device may comprise at least one valve. The respective pump may be fluidically separated from the process by means of the blocking device. In particular for the binder jetting already described above, it is possible to provide at least one heating means, by way of which it is possible to heat the evacuable volume.

An improvement to the drying of powdered and/or granular materials with as little outlay on equipment and costs as possible is further made by a vacuum conveyor for conveying a powdered and/or granular material for additive manufacturing, and in particular for conveying a metal powder or a metal powder blend. The vacuum conveyor accordingly comprises a device described in the present document for drying the powdered and/or granular material for additive manufacturing.

An improvement to the drying of powdered and/or granular materials with as little outlay on equipment and costs as possible is lastly made by a vacuum conveyor as described above for conveying a powdered and/or granular material for additive manufacturing, in particular for conveying a metal powder or a metal powder blend, in which a drying method described in the present document is carried out.

In one aspect of the invention, there is provided a method for drying a powdered and/or granular material for additive manufacturing, in particular for drying a metal powder or a metal powder blend, with the material to be dried being contained in an evacuable volume, in particular in a vacuum conveyor, the evacuable volume being fluidically connected to a vacuum pump arrangement, and the vacuum pump arrangement being fluidically connected on the inlet side to the evacuable volume and on the outlet side to the surroundings of the evacuable volume, and wherein the pump arrangement comprises a positive-displacement pump for vacuum drying and a jet pump for vacuum conveying, in particular a single-stage or multiple-stage ejector pump for vacuum conveying, or a compressor, in particular a side-channel compressor, for vacuum conveying.

In another aspect of the invention, there is provided a method for drying a powdered and/or granular material for additive manufacturing wherein the vacuum pump arrangement on the outlet side comprises a sensor for recording the moisture in the fluid pumped out of the evacuable volume, the sensor being used to record the residual moisture in the powdered and/or granular material as a function of the moisture in the fluid that is pumped out.

In another aspect of the invention, there is provided a method for drying a powdered and/or granular material for additive manufacturing wherein it comprises a calibration of the sensor by means of a test medium.

In another aspect of the invention, there is provided a method for drying a powdered and/or granular material for additive manufacturing wherein the pump arrangement comprises a positive-displacement pump, a jet pump, in particular a single-stage or multiple-stage ejector pump, and/or a compressor, in particular a side-channel compressor.

In another aspect of the invention, there is provided a method for drying a powdered and/or granular material for additive manufacturing wherein the sensor is arranged on the outlet side of the positive-displacement pump, in particular on or in an outlet-side flow channel of the positive-displacement pump.

In another aspect of the invention, there is provided a method for drying a powdered and/or granular material for additive manufacturing wherein a suction fluid flow, in particular suction air flow, is created in the evacuable volume by means of the pump arrangement, with the result that the powdered and/or granular material can be conveyed into the evacuable volume through a volume inlet by means of suction fluid flow, in particular suction air flow, and conveyed out of the evacuable volume through a volume outlet preferably by means of suction fluid flow, in particular suction air flow.

In another aspect of the invention, there is provided a method for drying a powdered and/or granular material for additive manufacturing wherein at least one blocking device can be actuated between the pump arrangement and the evacuable volume.

In another aspect of the invention, there is provided a method for drying a powdered and/or granular material for additive manufacturing wherein at least one reference moisture is recorded, which is preferably recorded in the surroundings of the evacuable volume.

In another aspect of the invention, there is provided a method for drying a powdered and/or granular material for additive manufacturing wherein, for the determination of the residual moisture in the powdered and/or granular material, the sensor signal and the change in the sensor signal over time are taken into account.

In another aspect of the invention, there is provided a method for drying a powdered and/or granular material for additive manufacturing wherein the evacuable volume is heated.

In another aspect of the invention, there is provided a device (1) for drying a powdered and/or granular material (2) for additive manufacturing, in particular for drying a metal powder or a metal powder blend, with the device (1) comprising an evacuable volume (3), which can be filled with the material (2) to be dried, a vacuum pump arrangement (7) fluidically connected to the evacuable volume (3) being provided, the vacuum pump arrangement (7) being fluidically connected on the inlet side to the evacuable volume (3) and on the outlet side to the surroundings of the evacuable volume (3), and wherein the pump arrangement (7) comprises a positive-displacement pump (11) for vacuum drying and a jet pump (10) for vacuum conveying, in particular a single-stage or multiple-stage ejector pump (10) for vacuum conveying, or a compressor, in particular a side-channel compressor, for vacuum conveying.

In another aspect of the invention, there is provided a device (1) for drying a powdered and/or granular material (2) for additive manufacturing wherein the vacuum pump arrangement (7) on the outlet side comprises a sensor (13) for recording the moisture of the fluid pumped out of the evacuable volume (3), the sensor (13) being able to be used to record the residual moisture in the powdered and/or granular material (2) as a function of the moisture in the fluid that is pumped out.

In another aspect of the invention, there is provided a device (1) for drying a powdered and/or granular material (2) for additive manufacturing wherein the pump arrangement (7) comprises a positive-displacement pump (11), a jet pump (10), in particular a single-stage or multiple-stage ejector pump (10), and/or a compressor, in particular a side-channel compressor.

In another aspect of the invention, there is provided a device (1) for drying a powdered and/or granular material (2) for additive manufacturing wherein the sensor (13) is arranged on the outlet side of the positive-displacement pump (11), in particular on or in an outlet-side flow channel (12) of the positive-displacement pump (11).

In another aspect of the invention, there is provided a device (1) for drying a powdered and/or granular material (2) for additive manufacturing wherein a suction fluid flow, in particular suction air flow, can be created in the evacuable volume (3) by means of the pump arrangement (7), with the result that the powdered and/or granular material (2) can be conveyed into the evacuable volume (3) through a volume inlet by means of suction fluid flow, in particular suction air flow, and conveyed out of the evacuable volume (3) through a volume outlet, preferably by means of suction fluid flow, in particular suction air flow.

In another aspect of the invention, there is provided a device (1) for drying a powdered and/or granular material (2) for additive manufacturing wherein it comprises at least one blocking device (14) which is arranged between the pump arrangement (7) and the evacuable volume (3).

In another aspect of the invention, there is provided a device (1) for drying a powdered and/or granular material (2) for additive manufacturing wherein it comprises at least one heating means, by way of which the evacuable volume (3) can be heated.

In another aspect of the invention, there is provided a vacuum conveyor (4) for conveying a powdered and/or granular material (2) for additive manufacturing, in particular for conveying a metal powder or a metal powder blend, wherein the vacuum conveyor (4) comprises a device (1) for drying the powdered and/or granular material as discussed above.

In another aspect of the invention, there is provided a vacuum conveyor (4) for conveying a powdered and/or granular material (2) for additive manufacturing, in particular for conveying a metal powder or a metal powder blend, wherein a method for drying the powdered and/or granular material (2) as discussed above and is carried out in the vacuum conveyor (4).

The aforementioned components and also the claimed components and components to be used according to the invention that are described in the exemplary embodiments are not subject to any exceptions in terms of their size, shape, material selection and technical design, and therefore the selection criteria known in the field of application can be applied without restriction.

Further details, features and advantages of the subject matter of the invention will emerge from the dependent claims, from the following description and from the associated drawing, which depicts—by way of example—a diagram of a drying device. It is also possible to combine individual features of the claims or of the embodiments with other features of other claims and embodiments.

BRIEF DESCRIPTION OF THE FIGURES

In the drawing:

FIG. 1 shows a diagram of a drying arrangement.

DETAILED DESCRIPTION OF EXEMPLARY EMBODIMENTS

An arrangement 1 for drying a material 2 in an evacuable volume 3 can be derived schematically from FIG. 1. The evacuable volume 3 may be in the form of a vacuum conveyor 4 or comprise a vacuum conveyor 4. In the vacuum conveyor 4 there is located the powdered and/or granular material 2 that is to be conveyed (or is conveyed) and dried and that enters the volume 3 through a (blockable) intake 5 and can be conveyed out of the volume 3 through a (blockable) material outlet 6.

The vacuum conveyor 4 is fluidically connected to a pump arrangement 7, for instance via a (suction) line 8 or a (suction) pipe. A filtering means 9, which filters the fluid flow to the pump arrangement 7, is arranged in the volume 3 so that the fluid flow is free of powder or dust originating from the material 2 in the volume 3. The pump arrangement 7 comprises a first pump 10 and a second pump 11, which are operated one after the other in normal operation. First of all, the material 2 is conveyed into the container 3, 4 by means of the first pump 10. Then, the material 2 is dried by vacuum drying by means of the second pump 11. In order that the first pump 10 and then the second pump 11 can be operated one after the other, a respective fluidic blocking device 14 is provided in the region of the sides of the pump inlet. The blocking device 14 may comprise a valve or be formed by a valve.

The first pump 10 may be in the form of a pneumatic vacuum pump, for instance an ejector pump. The second pump 11 of the pump arrangement 7 may be in the form of an electric (positive-displacement) vacuum pump, for example a vane oil pump or rotary-vane pump.

A (capacitive) moisture sensor 13, which can be used to record the moisture in the fluid (air) conveyed out of the pump arrangement 7 by the pump 11, is arranged in the exit gas flow or in the exit gas line 12 of the second pump 11. A suitable calibration, for instance by means of a test medium, makes it possible to calculate the residual moisture in the powdered and/or granular material 2 in the vacuum conveyor 4. The sensor 13 detects absolute values of the moisture in the exit air. In the course of the sensor evaluation, it is also possible to take into account, in addition to the absolute values, a change in the sensor values over time.

LIST OF REFERENCE SIGNS

1 Drying arrangement
2 Material
3 Volume
4 Vacuum conveyor
5 Intake
6 Material outlet
7 Pump arrangement
8 Line
9 Filtering means
10 First pump, ejector pump
11 Second pump, positive-displacement pump
12 Exit air channel
13 Sensor
14 Blocking device, valve

The invention claimed is:

1. A method for drying a a metal powder or a metal powder blend, with the powdered and/or granular material to be dried being contained in an evacuable volume the evacuable volume includes a vacuum conveyor, the evacuable volume being fluidically connected to a vacuum pump arrangement, and the vacuum pump arrangement being fluidically connected on an inlet side to the evacuable volume and on an outlet side to a surroundings of the evacuable volume, wherein the vacuum pump arrangement comprises a single-stage or multiple-stage ejector pump for vacuum conveying, or a side-channel compressor for vacuum conveying, and wherein the vacuum pump arrangement on the outlet side comprises a sensor for recording a moisture in a fluid pumped out of the evacuable volume, the sensor used to record a residual moisture in the powdered and/or granular material as a function of the moisture in the fluid that is pumped out; and wherein, for the determination of the residual moisture in the powdered and/or granular material, the sensor signal and the change in the sensor signal over time are taken into account.

2. The method as claimed in claim 1, further comprises a calibration of the sensor by means of a test medium.

3. The method as claimed in claim 1, wherein the pump arrangement comprises a positive-displacement pump, a single-stage or multiple-stage ejector pump, and/or a side-channel compressor.

4. The method as claimed in claim 3, wherein the sensor is arranged on or in an outlet-side flow channel of the positive-displacement pump.

5. The method as claimed in claim 1, wherein a suction air flow is created in the evacuable volume by means of the pump arrangement, with the result that the powdered and/or granular material can be conveyed into the evacuable volume through a volume inlet by means of suction air flow, and conveyed out of the evacuable volume through a volume outlet by means of the suction air flow.

6. The method as claimed in claim 1, wherein at least one blocking device can be actuated between the vacuum pump arrangement and the evacuable volume.

7. The method as claimed in claim 1, wherein at least one reference moisture is recorded, which is preferably recorded in the surroundings of the evacuable volume.

8. The method as claimed in claim 1, wherein the evacuable volume is heated.

9. A vacuum conveyor for conveying the metal powder or the metal powder blend, wherein a method for drying the metal powder or the metal powder blend as claimed in claim 1 is carried out in the vacuum conveyor.

10. A method for drying a powdered and/or granular material comprising:

a. providing an evacuable device having a material inlet;

b. providing a vacuum pump arrangement that is connected to said evacuable device; said vacuum pump arrangement is configured to both convey said powdered and/or granular material to said evacuable device and to remove fluid from said evacuable device; said evacuable pump arrangement includes first and second pumps; said first pump is a different type of pump from said second pump;

c. providing a moisture sensor to measure moisture in said fluid that is removed from said evacuable device;

d. conveying said powdered and/or granular material into said inlet of said evacuable device using said vacuum pump arrangement by said first pump; and e. drawing fluid out of said evacuable device using said vacuum pump arrangement by said second pump so as to dry said powdered and/or granular material while in said evacuable device; and wherein said vacuum pump arrangement does not remove fluid said evacuable device while said first pump is causing said powdered and/or granular material to be conveyed into said evacuable device; and wherein said vacuum pump arrangement does not cause said powdered and/or granular material to be conveyed into said evacuable device by said first pump while said second pump is causing fluid to be removed from said evacuable device; and wherein said sensor is configured to record said moisture in said fluid and to record a residual moisture in said powdered and/or granular material as a function of said moisture in said fluid that is removed from said evacuable device.

11. The method as defined in claim 10, further including one or more of a) at least one blocking device that is configured to actuated between said vacuum pump arrangement and said evacuable device, and/or b) a heating arrangement that is configured to heat said powdered and/or granular material while in said evacuable device.

12. The method as defined in claim 10, wherein said moisture sensor is configure to perform one or more operations selected from the group of a) recording at least one reference moisture value that is a moisture content in an ambient environment about said evaluable device, and b) determining a change in moisture levels of said fluid removed from said evaluable device over a period of time.

13. A device for drying a powdered and/or granular material; said device comprises a. an evacuable device that includes a material inlet; said evacuable device configured to hold said powdered and/or granular material while said powdered and/or granular material is dried in said evacuable device;

b. a vacuum pump arrangement that is connected to said evacuable device; said vacuum pump arrangement is configured to both convey said powdered and/or granular material to said evacuable device and to remove fluid from said evacuable device; said evacuable pump arrangement includes first and second pumps; said first pump is a different type of pump from said second pump;

c. a moisture sensor that is configured to measure moisture in said fluid that is removed from said evacuable device; and wherein said vacuum pump arrangement is configured to convey said powdered and/or granular material into said inlet of said evacuable device using said first pump; and wherein said fluid is removed from said evacuable device using said second pump of said vacuum pump arrangement so as to dry said powdered and/or granular material while in said evacuable device; and wherein said vacuum pump arrangement is configured to not remove fluid said evacuable device while said first pump is causing said powdered and/or granular material to be conveyed into said evacuable device; and wherein said vacuum pump arrangement is configured to not cause said powdered and/or granular material to be conveyed into said evacuable device by said first pump while said second pump is causing fluid to be removed from said evacuable device; and wherein said sensor is configured to record said moisture in said fluid and to record a residual moisture in said powdered and/or granular material as a function of said moisture in said fluid that is removed from said evacuable device.

14. The device as defined in claim 13, further including one or more of a) at least one blocking device that is configured to actuated between said vacuum pump arrangement and said evacuable device, and/or b) a heating arrangement that is configured to heat said powdered and/or granular material while in said evacuable device.

15. The device as defined in claim 13, wherein said moisture sensor is configure to perform one or more operations selected from the group of a) recording at least one reference moisture value that is a moisture content in an ambient environment about said evaluable device, and b) determining a change in moisture levels of said fluid removed from said evaluable device over a period of time.

* * * * *